E. AND S. W. LIPPITT.
REVERSING MECHANISM.
APPLICATION FILED JUNE 3, 1919. RENEWED JUNE 25, 1921.
1,387,855.
Patented Aug. 16, 1921.
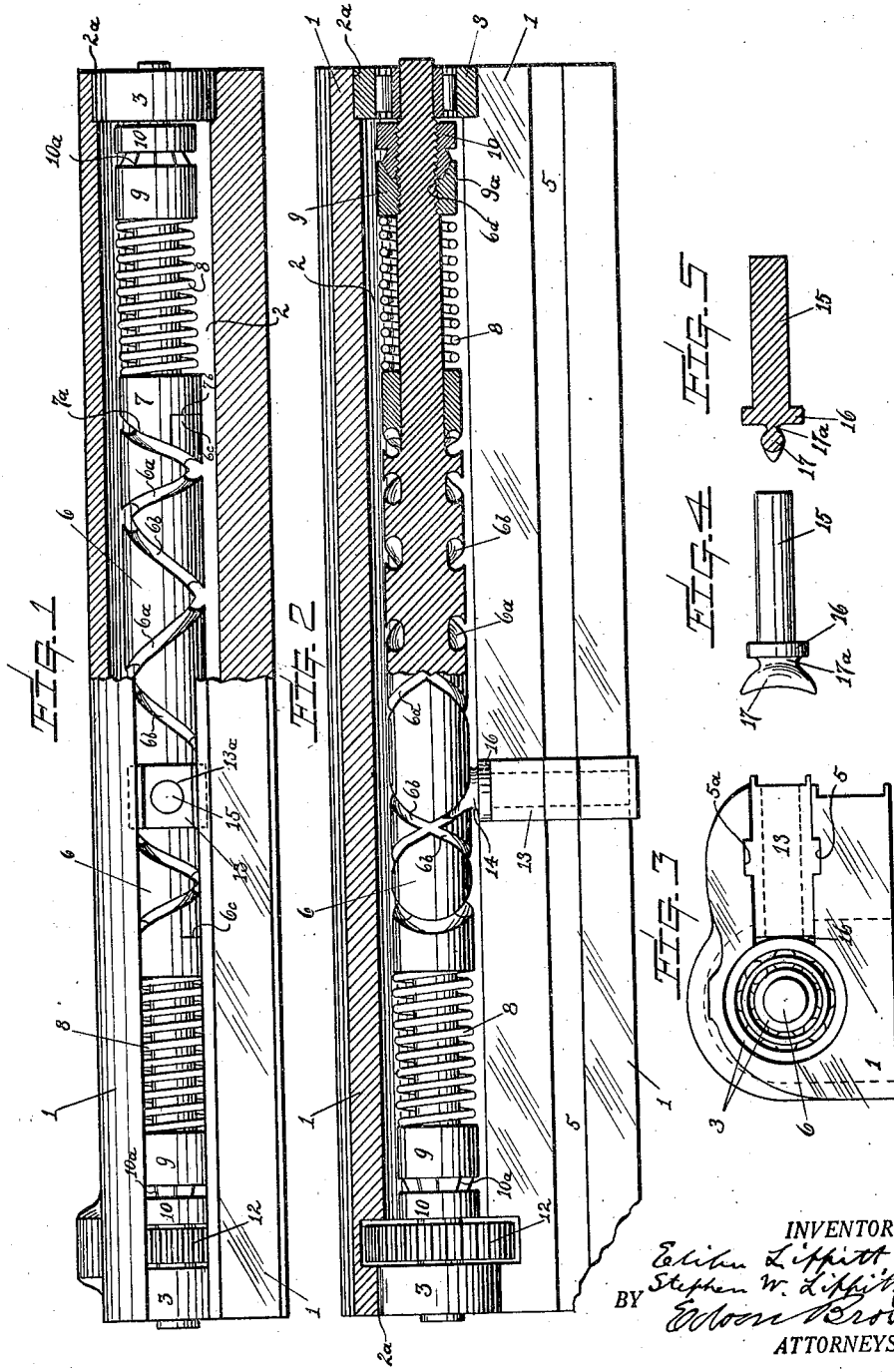
INVENTORS
Elihu Lippitt
Stephen W. Lippitt
BY
ATTORNEYS.

UNITED STATES PATENT OFFICE.

ELIHU LIPPITT AND STEPHEN W. LIPPITT, OF CLEVELAND, OHIO.

REVERSING MECHANISM.

1,387,855. Specification of Letters Patent. Patented Aug. 16, 1921.

Application filed June 3, 1919, Serial No. 301,436. Renewed June 25, 1921. Serial No. 480,483.

*To all whom it may concern:*

Be it known that we, ELIHU LIPPITT and STEPHEN W. LIPPITT, citizens of the United States, residing at Cleveland, in the county of Cuyahoga and State of Ohio, have invented certain new and useful Improvements in Reversing Mechanism; and we do hereby declare the following to be a full, clear, and exact description of the invention, such as will enable others skilled in the art to which it appertains to make and use the same.

The invention relates to reversing mechanisms for flat knitting machines or other devices wherein a part is reciprocated back and forth along a rectilinear path, the principal objects of the invention being the attainment of high speeds, and the minimizing of the shocks which attend rapid reversals of the motions of the reciprocating element.

The invention will be fully understood by referring to the accompanying drawings, in which:

Figure 1 is a view of the device in elevation, certain of the parts being shown in section;

Fig. 2 is a similar plan view of the device;

Fig. 3 is an end elevation;

Fig. 4 is a view of the traveling nut, and

Fig. 5 is a sectional view of said nut.

1 is a guide bar through which extends a bore 2, the ends of which are enlarged at $2^a$, for the reception of ball bearings 3.

The guide bar 1 is provided with a slot 4, having channels 5, $5^a$, in its lower and upper walls.

Disposed within and fitting the bore 2 of the guide bar 1, is a cam shaft 6, having undercut or circular cam grooves, $6^a$, $6^b$, which cross each other at certain intervals. This shaft is sustained by the roller bearings 3 into which its reduced ends extend, said ends being screwed thereto at $6^d$. These reduced ends each carry a separable shock slide 7, a coiled shock spring 8, an adjusting nut 9, and a jam nut 10, for said adjusting nut, the resistance of the spring being regulable by said adjusting nut 9. The adjusting nut 9, is provided with a conical recess $9^a$, into which the conical slitted end $10^a$, of the jam nut extends, the object of these slits being to admit of the contraction of said end upon the screw threads $6^d$, to thereby prevent retraction of said jam nut.

The shock slides 7, have each an undercut cam groove $7^a$, which connects the cam grooves $6^a$, $6^b$, in order to establish their continuity, and the cam shaft and each shock slide 7, are interlocked by shoulders $6^c$, $7^d$, which effectuate their unitary operative relationship, although the separability of said shock slide admits of its renewal when the traveling nut, 14, is to be inserted in one of the cam grooves.

The traveling nut 14 is carried by a sliding block 13, which matches and slides within the slot 4 of the guide bar 1, said sliding block being provided with a hole $13^a$, within which the shank 15, of said traveling nut oscillates. Said traveling nut is provided with a flange 16, and a cam 17, which interlocks with the cam grooves $6^a$, $6^b$, the neck $17^a$, of said nut being of such size as to fit between the lips of said grooves.

The cam grooves $6^a$, $6^b$, have three different pitches, the lesser pitch being toward the shock block 7, the object being to secure a gradual deceleration of the reciprocating motion to one-half the center speed when the cam 17 has reached the shock-slide 7, and thus diminish the shock, this result being enhanced by the shock springs 8, to which shocks are transmitted from the shock slides 7.

The cam shaft is provided with a gear 12, at one end thereof which is driven by some other gear of the device. The cam shaft is made to rotate at a constant speed causing the cam 17, and the sliding block 13, in which its shank 15, is pivoted, to follow the cam groove $6^a$ or $6^b$, until it reaches the cam groove $7^a$, of the shock block 7, through which said cam is transferred to the other cam groove, and the direction of its motion reversed. Although the speed of the cam and the sliding block has greatly reduced before it enters said shock block, its momentum may be still such as to transmit shock to said slide block. These residual shocks will be taken by the proximate coiled shock spring 8, and thereby rendered substantially negligible.

When the device is installed in a knitting machine, the bore 2, of the guide bar will be disposed at a lower altitude than the open slot 4 thereof, so that the unoccupied spaces therein may be filled with a lubricant.

Knitting machines equipped with the reversing mechanism, herein described, may be run at a very high speed without producing shocks of any considerable magnitude, and this fact is of great importance since the output of the product is proportionate to the speed.

It will be understood that the sliding block 13, is to be attached to an operated element of a knitting or other machine in which reproductions of said element are desired, and that the traveling cam may, in some instances, be directly connected with said element.

Having thus described our invention, what we claim and desire to secure by Letters Patent is:

1. A reversing mechanism having a slotted guide bar, a shaft disposed within a bore of said guide bar and provided with crossed cam grooves of varying pitch, a cam adapted to traverse said cam groove, and shock slides having cam grooves which unite said crossed cam grooves.

2. A reversing mechanism having a driven shaft, shock slides disposed at the ends of said shaft, said shaft and said shock slides being provided with a reversing cam groove, and a cam associated with said cam groove.

3. A reversing mechanism comprising a guideway, a shaft journaled in parallelism with the guideway and provided with spiral grooves crossed at intervals throughout its length, extreme portions formed upon the ends of said shaft and movable axially relative thereto and containing continuations of the spiral grooves and yielding means for holding the sections in organized relation to the shaft.

4. A reversing mechanism embodying a guideway, a shaft journaled in parallelism with the guideway and composed of a plurality of axially movable parts, yielding means for holding the several parts in a unitary structure, said several parts embodying a spiral groove pitched in opposite directions and crossing at intervals, joining at the extremes in the movable parts of the shaft.

5. A reversing mechanism, comprising a guideway, a shaft journaled in parallelism with the guideway, movable parts forming continuations of the extremes of the shaft, springs adapted to hold the movable sections in engagement with the shaft, said shaft and movable extensions being provided with spiral grooves crossed at intervals and united at the ends in the movable sections, and a follower mounted to move in and follow the spiral grooves and move along the guideway.

6. A reversing mechanism comprising a guideway, a shaft journaled in parallelism with the guideway, and provided with independently movable extremes, springs for holding the extremes in unitary relation with the shaft, said shaft and extreme sections being provided with crossed spiral grooves united in the movable sections, a member movable along the guideway, and a member fitted and movable in the groove and carried by the member movably along the guideway.

In testimony whereof, we affix our signatures.

ELIHU LIPPITT.
STEPHEN W. LIPPITT.